US011706192B2

(12) United States Patent
Akyol et al.

(10) Patent No.: US 11,706,192 B2
(45) Date of Patent: Jul. 18, 2023

(54) INTEGRATED BEHAVIOR-BASED INFRASTRUCTURE COMMAND VALIDATION

(71) Applicant: Battelle Memorial Institute, Richland, WA (US)

(72) Inventors: Bora A. Akyol, El Dorado Hills, CA (US); Jereme N. Haack, West Richland, WA (US); Thomas E. Carroll, Richland, WA (US); Kyle E. Monson, West Richland, WA (US); Penny L. McKenzie, Kennewick, WA (US); Keith W. Thornhill, Pasco, WA (US); Michael E. Mylrea, Alexandria, VA (US)

(73) Assignee: Battelle Memorial Institute, Richland, WA (US)

( * ) Notice: Subject to any disclaimer, the term of this patent is extended or adjusted under 35 U.S.C. 154(b) by 272 days.

(21) Appl. No.: 16/655,071

(22) Filed: Oct. 16, 2019

(65) Prior Publication Data

US 2020/0127973 A1 Apr. 23, 2020

Related U.S. Application Data

(60) Provisional application No. 62/746,917, filed on Oct. 17, 2018.

(51) Int. Cl.
*H04L 9/40* (2022.01)
*G05B 9/02* (2006.01)
*G06N 3/08* (2023.01)

(52) U.S. Cl.
CPC ............ *H04L 63/0209* (2013.01); *G05B 9/02* (2013.01); *G06N 3/08* (2013.01)

(58) Field of Classification Search
CPC ......... H04L 63/0209; G05B 9/02; G06N 3/08
(Continued)

(56) References Cited

U.S. PATENT DOCUMENTS 4,636,934 A * 1/1987 Schwendemann ......................... E21B 33/0355
137/624.18
6,262,900 B1 * 7/2001 Suntio ..................... H02J 1/102
363/69

(Continued)

OTHER PUBLICATIONS

Mathur, Aditya. "SecWater: A multi-layer security framework for water treatment plants." In Proceedings of the 3rd International Workshop on Cyber-Physical Systems for Smart Water Networks, pp. 29-32. 2017. (Year: 2017).*

(Continued)

*Primary Examiner* — Luu T Pham
*Assistant Examiner* — Walter J Malinowski
(74) *Attorney, Agent, or Firm* — Klarquist Sparkman, LLP

(57) ABSTRACT

A cybersecurity infrastructure command validation system is provided herein for validating asset commands issued within an infrastructure network. The cybersecurity infrastructure command validation system can be integrated into an infrastructure network to monitor and validate infrastructure asset commands in real-time or while the infrastructure network is active. The cybersecurity infrastructure command validation system can receive or intercept commands issued by asset controllers. The cybersecurity infrastructure command validation system can validate the commands based on a command validation model. The command validation model can represent normal operating behavior of the infrastructure network. The cybersecurity infrastructure command validation system can provide valid commands to the intended infrastructure asset, or can reject invalid com- (Continued)

mands. The cybersecurity infrastructure command validation system can store validation results for use in updating the command validation model. The cybersecurity infrastructure command validation system can flag or otherwise warn the infrastructure network or administrators of invalid commands.

20 Claims, 10 Drawing Sheets

(58) Field of Classification Search
USPC .......................................................... 726/11
See application file for complete search history.

(56) References Cited

U.S. PATENT DOCUMENTS

| | | | |
|---|---|---|---|
| 6,895,248 B1 | 5/2005 | Akyol et al. | |
| 9,071,611 B2 | 6/2015 | Yadav et al. | |
| 9,094,385 B2 | 7/2015 | Akyol et al. | |
| 9,183,153 B2 | 11/2015 | Yin et al. | |
| 9,923,723 B2 | 3/2018 | Akyol et al. | |
| 10,263,786 B2 | 4/2019 | Akyol et al. | |
| 10,313,141 B1* | 6/2019 | Elberbaum | H04L 12/12 |
| 11,123,140 B1* | 9/2021 | Sweis | A61B 34/10 |
| 2003/0191919 A1* | 10/2003 | Sato | G06F 3/067 |
| | | | 711/154 |
| 2004/0215438 A1* | 10/2004 | Lumpkin | G06F 30/33 |
| | | | 703/22 |
| 2005/0256956 A1 | 11/2005 | Littlefield et al. | |
| 2009/0132852 A1* | 5/2009 | Sekiya | G06K 7/10811 |
| | | | 714/15 |
| 2012/0029897 A1* | 2/2012 | Cherian | H02J 13/00 |
| | | | 703/18 |
| 2012/0216239 A1 | 8/2012 | Yadav et al. | |
| 2013/0036311 A1 | 2/2013 | Akyol et al. | |
| 2013/0066610 A1* | 3/2013 | Stevens | G06Q 10/08 |
| | | | 703/6 |
| 2013/0119660 A1* | 5/2013 | Yasugi | H02J 3/466 |
| | | | 290/44 |
| 2013/0297868 A1 | 11/2013 | Yin et al. | |
| 2014/0295772 A1* | 10/2014 | Van Greunen | H04L 63/0428 |
| | | | 455/68 |
| 2015/0234407 A1* | 8/2015 | Makino | H02J 13/0006 |
| | | | 700/291 |
| 2016/0006569 A1 | 1/2016 | Akyol et al. | |
| 2016/0043549 A1* | 2/2016 | Beauregard | H04L 67/12 |
| | | | 700/286 |
| 2016/0142266 A1 | 5/2016 | Carroll et al. | |
| 2016/0379143 A1 | 12/2016 | Trubin et al. | |
| 2017/0161497 A1* | 6/2017 | Jeansonne | G06F 21/57 |
| 2017/0346684 A1* | 11/2017 | Ratkovic | H04L 41/0886 |
| 2017/0346846 A1* | 11/2017 | Findlay | H04L 63/1433 |
| 2018/0032503 A1* | 2/2018 | Swart | G06F 16/9535 |
| 2018/0159691 A1 | 6/2018 | Akyol et al. | |
| 2018/0302306 A1 | 10/2018 | Carroll et al. | |
| 2019/0303807 A1* | 10/2019 | Gueye | G06Q 20/3224 |
| 2020/0045021 A1* | 2/2020 | Martin | H04L 63/0428 |
| 2020/0119556 A1* | 4/2020 | Shi | G05B 13/027 |
| 2021/0192934 A1* | 6/2021 | Ma | G08C 23/04 |
| 2021/0318670 A1* | 10/2021 | Cunningham | H04L 9/3273 |

OTHER PUBLICATIONS

Christensen, B., William Drotning, S. Thunborg, and R. W. Harrigan. "Model based, sensor directed remediation of underground storage tanks." In Proceedings. 5th IEEE International Symposium on Intelligent Control 1990, pp. 923-931. IEEE, 1990. (Year: 1990).*
Bozic, Nikola, Guy Pujolle, and Stefano Secci. "Securing virtual machine orchestration with blockchains." In 2017 1st Cyber Security in Networking Conference (CSNet), pp. 1-8. IEEE, 2017. (Year: 2017).*
Agarwal, Vikas, Chris Butler, Lou Degenaro, Arun Kumar, Anca Sailer, and Gosia Steinder. "Compliance-as-Code for Cybersecurity Automation in Hybrid Cloud." In 2022 IEEE 15th International Conference on Cloud Computing (CLOUD), pp. 427-437. IEEE, 2022. (Year: 2022).*
Chen et al., "A Model-based Approach to Self-Protection in SCADA Systems," available at: https://www.usenix.org/system/files/conference/feedbackcomputing14/feedback14-chen.pdf, 7 pages, retrieved on Oct. 21, 2019.
"Hybrid State Monitoring for Detection of Attacks to Protective Relays," TCIPG, available at: https://tcipg.org/technology/hybrid-state-monitoring-detection-attacks-protective-relays, 3 pages, retrieved on Oct. 21, 2019.
Chipley, "Cybersecurity," Whole Building Design Guide, available at: http://www.wbdg.org/resources/cybersecurity, 21 pages, last updated: Mar. 27, 2017, retrieved on Oct. 15, 2019.
CrowdStrike, available at: https://www.crowdstrike.com/, 11 pages, retrieved on Oct. 15, 2019.
PacStar, available at: https://pacstar.com/, 2 pages, retrieved on Oct. 15, 2019.
TWT, available at: http://transformativewave.com/, 5 pages, retrieved on Oct. 15, 2019.
Zhu et al., "SCADA-specific Intrusion Detection/Prevention Systems: A Survey and Taxonomy," *Proc. of the 1st Workshop on Secure Control Systems*, 16 pp. (2010).

* cited by examiner

INTEGRATED BEHAVIOR-BASED INFRASTRUCTURE COMMAND VALIDATION

CROSS-REFERENCE TO RELATED APPLICATION

This application claims the benefit of U.S. Provisional Patent Application No. 62/746,917, filed Oct. 17, 2018, which is hereby incorporated by reference herein.

ACKNOWLEDGMENT OF GOVERNMENT SUPPORT

This invention was made with Government support under Contract DE-AC05-76RL01830 awarded by the U.S. Department of Energy. The Government has certain rights in the invention.

BACKGROUND

The energy industry and electrical grid are important components of modern life, and are under increasing threat of cyberattacks. Such threats may target both the software and hardware installed in the electrical grid, and may specifically target control system environments. In such cyberattacks, unauthorized access to control systems may be obtained, which can allow the attacker to appear as a privileged insider. Such unauthorized access can allow an attacker to issue commands to components that appear valid with current inspection techniques. Further, installed legacy systems or components are particularly difficult to protect without significant cost to upgrade or replace, which may be well before the end of the systems' or components' useful life span. Accordingly, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of protecting a set of controlled infrastructure assets in an infrastructure system is provided herein. A command for one of the set of controlled infrastructure assets can be received. The received command can be validated, according to a command validation model. The command validation model can have been generated based on data representing at least part of the infrastructure system. Responsive to a successful validation, the received command can be provided to the one of the set of controlled infrastructure assets.

One or more non-transitory computer-readable storage media storing computer-executable instructions for causing a computing system to perform operations for infrastructure system protection are provided herein. A command for a target infrastructure asset of a plurality of infrastructure assets can be received. The plurality of infrastructure assets can be integrated into an infrastructure system. The received command can be validated, according to a command validation model. The command validation model can have been generated based on the plurality of infrastructure assets. Responsive to a successful validation, the received command can be provided to the target infrastructure asset.

A system for infrastructure asset security is provided herein. The system can perform asset command validation operations. State data of an infrastructure asset can be collected. Validation results data of the infrastructure asset can be collected. The validation results data can include command validation results of one or more previously-processed commands for the infrastructure asset. A command validation model can be configured. The command validation model can be based, at least in part, on the collected state data and the collected validation results data. A new command for the infrastructure asset can be intercepted. Intercepting the new command can prevent or delay the new command from being received by the infrastructure asset. The new command can be analyzed according to the command validation model. Analyzing the new command can include determining if the new command is improperly formed or if the new command meets a threshold for causing the infrastructure asset to enter a detrimental state when executed by the infrastructure asset. Responsive to the analyzing, the new command can be provided to the infrastructure asset, or a log can be updated based on the analysis without providing the new command to the infrastructure asset.

The foregoing and other objects, features, and advantages of the invention will become more apparent from the following detailed description, which proceeds with reference to the accompanying figures.

DETAILED DESCRIPTION

Example 1—Overview

Figure 1:
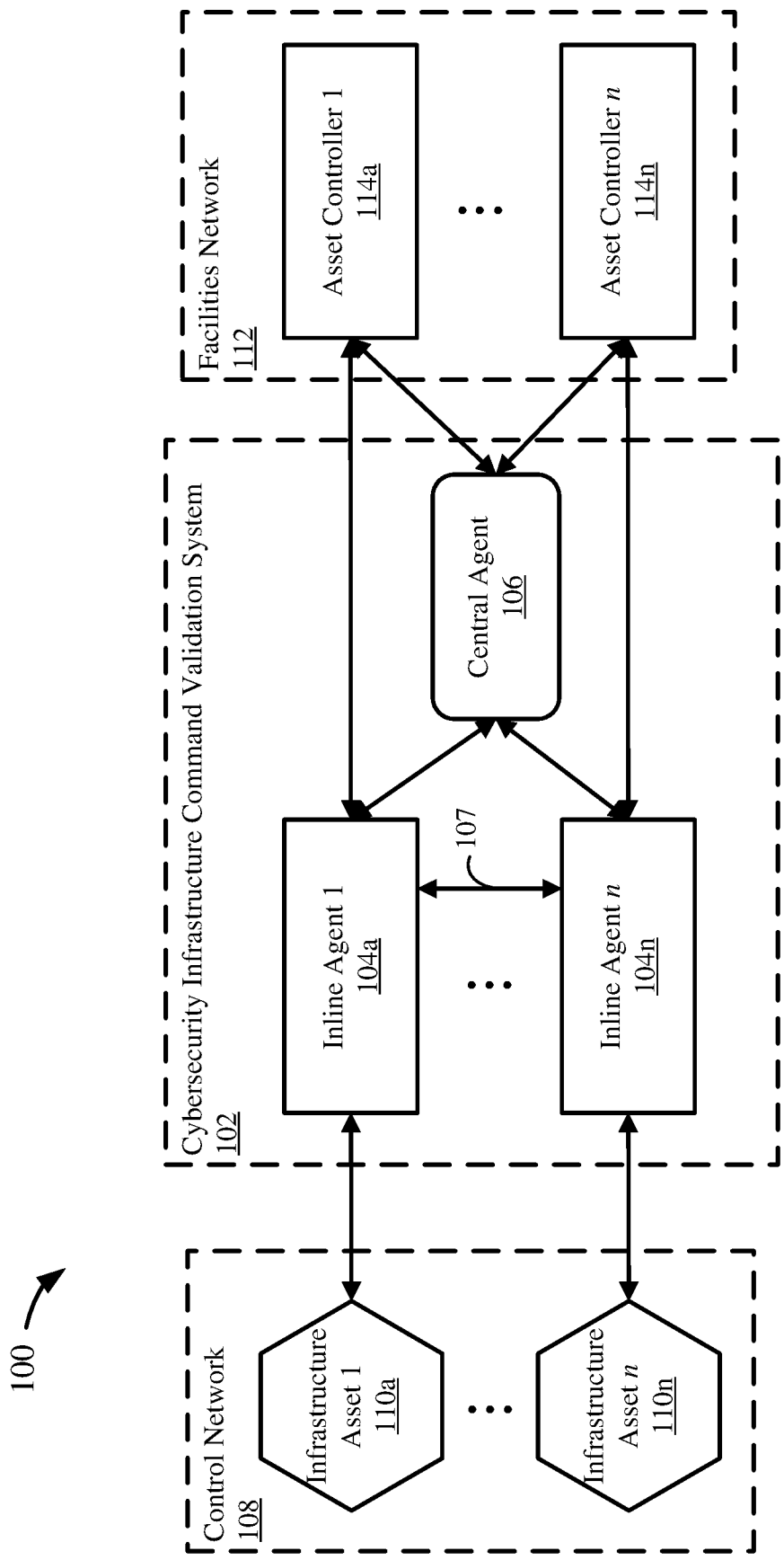
FIG. 1 is an architectural diagram depicting an infrastructure network with a cybersecurity infrastructure command validation system.

Building & grid owners and operators cannot monitor system control messages to determine whether they might degrade the controlled equipment into an unsafe or unstable state, or shorten equipment lifetimes drastically. The present description provides examples of techniques to detect malicious or erroneous commands that could cause instabilities or problems in the power grid, including a methodology for fast power system command validation. This includes an inline security device with two interfaces running VOLTTRON, which will use machine learning to build a conceptual model of the controlled device based on data readings and then validate the commands issued to the device to ensure device operates in a pre-defined performance envelope.

In a typical environment VOLTTRON devices in the network are managed by VOLTTRON Central, and will exchange information with each other to build awareness of their neighbors and their states. The described solutions will be suitable for deployment in environments where legacy/non-secure protocols are used. E.g. Modbus, BACnet, and others, and will be targeted towards buildings and grid integration as an initial use case, to improve security in the distribution system.

While control systems rely on standard cyber perimeter defenses and other network and host security mechanisms, such capabilities were not designed with control system environments in mind. Recent energy sector security incidents demonstrate that existing cyber security capabilities are insufficient to maintain the integrity and security of control system networks. Adversaries have demonstrated the ability to gain unauthorized access to control system environments and have successfully operated as privileged insiders (the ability to undermine power grid reliability). Mechanisms that rely ONLY on deep packet inspection are not sufficient to protect buildings or the grid. Completely valid looking packets can still cause damage. Encryption is not a panacea and it is difficult to retrofit into legacy protocols. Establishing and verifying behaviors of devices, information, and command sequences provide another path forward wherein if an anomaly is detected, the session may be terminated.

A cybersecurity infrastructure command validation system, as described herein, can be a firewall-type application which can monitor and control communications, inspecting and forwarding Ethernet frames that satisfy inspection criteria, within an infrastructure framework. The cybersecurity infrastructure command validation system can be designed as a network bridge that partitions the network into two segments. The first segment can include untrusted devices while the second segment can include trusted devices. Traffic between the segments can transverse the cybersecurity infrastructure command validation system. Traffic sourced from untrusted devices to trusted devices can thus be controlled or managed, such as by dropping packets.

As an example, cybersecurity infrastructure command validation system can process packets from kernel queues in an infrastructure network, send the packets, along with metadata, as model input to a defined set of command validation models, receive model output responses regarding command validation of commands in the packet, such as pass/drop/no decision, aggregate and reduce the command validation model responses, and perform an action with packet dependent on the final command validation response, such as pass or drop. The pass action can continue or forward the packet (e.g. command) for normal packet processing and forwarding packet flow, while drop can terminate the packet (e.g. command) processing and can result in the packet being discarded.

The cybersecurity infrastructure command validation system can be modular. For example, VOLTTRON agents can submit inspection routines and/or criteria, which can be integrated into command validation models. The command validation models can support state-based inspections and can establish behavior baseline models with which to compare communications within the infrastructure network.

For example, the cybersecurity infrastructure command validation system architecture can include two classes of actors. The first actor can be an inline and/or central agent, firewall-type application that can monitor and control communications. In some embodiments, the inline/central agent can integrate itself into a packet handling chain (e.g. a Linux packet handling chain) via a queue (e.g. the netfilter NFQUEUE) subsystem. Responsibilities of the inline/central agent can include: 1. inhibit command (e.g. packet) processing and retrieve commands (e.g. packets) from the kernel queues, 2. send the commands (e.g. packets) and associated metadata to a set of command validation models, 3. receive, aggregate, and reduce command validation model responses, and/or 4. perform pass or drop actions in response to the command validation.

The second actor can be a modeler or model generator, which can design a command validation model, which can be registered with the inline/central agent. In some embodiments, multiple models can be registered from one or more modelers. Responsibilities of the model generator can include: 1. expose an endpoint (e.g. inspect RPC endpoint) to receive command validation requests, 2. timely characterize commands (e.g. packets and metadata) when endpoint is invoked, and/or 3. respond with a result of command validation (e.g. pass, drop, or no decision).

A command validation model can be either a static-type or dynamic-type model. A static model can be configured at the start of execution via a configuration statement. A dynamic model can register (e.g. via a register RPC endpoint), at regular intervals, with an inline/central agent during execution. A model that does not respond within a threshold time period (for reasons such as: host unreachable, communication failure, timeout, etc.) can be excluded from future command validations. Static models can be re-enabled at regular intervals. Generally, a dynamic model should be registered at regular intervals to be accessed and used in command validation.

Both the inline/central agent and the modeler can be implemented as VOLTTRON agents executing on the VOLTTRON platform.

During command validation, the inline/central agent can interrogate the registered models (e.g. in the forwarding plane) to form an aggregate forward or discard decision. If the decision is to forward, the packet can be allowed to proceed; otherwise, the packet can be dropped and an error message provided to the sender or other network hub or administrator (e.g. ICMP Communication Administratively Prohibited).

Additional advantages and novel features of the present disclosure will be set forth herein and in the attached pages and will be readily apparent from the descriptions and demonstrations set forth hereafter. Accordingly, the following descriptions of the present disclosure should be seen as illustrative of the disclosure and not as limiting in any way.

Various advantages and novel features of the present disclosure are described herein and will become further readily apparent to those skilled in this art from the following detailed description. In the preceding and following descriptions, I have shown and described only the preferred embodiment of the disclosure, by way of illustration of the best mode contemplated for carrying out the disclosure. As will be realized, the disclosure is capable of modification in various respects without departing from the disclosure.

Accordingly, the drawings and description of the preferred embodiment set forth hereafter are to be regarded as illustrative in nature, and not as restrictive.

Example 2—Cybersecurity Infrastructure Command Validation System in an Infrastructure Network FIG. 1 is an architectural diagram depicting an infrastructure network 100 with a cybersecurity infrastructure command validation system 102. The infrastructure network 100 can include one or more infrastructure assets 110a-n and one or more asset controllers 114a-n. The asset controllers 114a-n generally control the infrastructure assets 110a-n, such as by sending commands to the infrastructure assets. Generally, an asset controller 114a-n is associated with an infrastructure asset 110a-n, such that a given asset controller generally issues commands for a given infrastructure asset. For example, asset controller 1 114a may be associated with and so issue commands to infrastructure asset 1 110a. In some embodiments, a single asset controller 114a-n may issue commands to multiple infrastructure assets 110a-n. Alternatively or additionally, a single infrastructure asset 110a-n may receive commands from multiple asset controllers 114a-n. In some embodiments, the infrastructure assets 110a-n can be arranged in a control network 108. In some embodiments, the asset controllers 114a-n can be arranged in a facilities network 112.

A cybersecurity infrastructure command validation system 102 can be placed, inserted, or otherwise installed between the infrastructure assets 110a-n and the asset controllers 114a-n. The cybersecurity infrastructure command validation system 102 can provide command validation functionality for validating commands issued by the asset controllers 114a-n before the issued commands are received and executed by the infrastructure assets 110a-n. Alternatively or additionally, the cybersecurity infrastructure command validation system 102 can be placed just before the infrastructure assets 110a-n to receive and validate commands intended for the infrastructure assets, regardless of origin of the commands. In this way, the cybersecurity infrastructure command validation system 102 can intercept commands sent to the infrastructure assets 110a-n, and validate the commands before they are received or executed by the infrastructure assets.

The cybersecurity infrastructure command validation system 102 can include one or more inline agents 104a-n and, alternatively or additionally, can include a central agent 106. The inline agents 104a-n and the central agent 106 can provide command validation functionality as described herein, either separately, individually, or in combinations thereof.

Generally, an inline agent 104a-n is associated with an infrastructure asset 110a-n, such that a given inline agent generally validates commands for a given infrastructure asset. For example, inline agent 1 104a may be associated with, and so validate commands for, infrastructure asset 1 110a. An inline agent 104a-n may receive commands from one or more asset controllers 114a-n which may be issuing commands to the inline agent's associated infrastructure asset 110a-n. For example, asset controller 1 114a can be the controller associated with infrastructure asset 1 110a, and inline agent 1 104a can be the associated inline agent for infrastructure asset 1. Accordingly, inline agent 1 104a may receive, obtain, or otherwise intercept commands from asset controller 1 114a intended for infrastructure asset 1 110a, and perform command validation on the received command as described herein.

In some embodiments, the inline agents 104a-n can perform command validation along with a central agent 106. For example, in some embodiments, an inline agent 104a-n can provide the received command and other relevant data to the central agent 106 for validation. In other embodiments, an inline agent 104a-n can receive a command validation model or algorithm from the central agent 106. In still other embodiments, command validation may be split and performed by both the inline agent 104a-n and the central agent 106.

Additionally or alternatively, a central agent 106 can coordinate command validation between multiple inline agents 104a-n. For example, a central agent 106 can generate, update, or refine a command validation model using data received from one or more of the inline agents 104a-n. The central agent 106 can also, in some cases, facilitate command validation either by itself or the inline agents 104a-n based on information received from other inline agents or the asset controllers 114a-n. For example, in such embodiments, the central agent 106 can communicate a system-wide warning which may affect command validation (e.g. halt or pause all activity). A central agent 106 can also receive data from the asset controllers 114a-n, which can be used for command validation, such as for command validation model generation.

In some embodiments, the cybersecurity infrastructure command validation system 102 may not include a central agent 106. In such embodiments, the inline agents 104a-n may communicate directly with each other 107. Such communication can include all inline agents 104a-n which are able to communicate with all other inline agents, or can include a specific or defined series of communication between the inline agents (e.g. a linked list-style of connections between inline agents). In such embodiments, the inline agents 104a-n can share information for generating, developing, updating, or refining their respective command validation models, or for sharing their command validation models in part or in whole.

In practice, the systems shown herein, such as the infrastructure network 100, can vary in complexity, with additional functionality, more complex components, and the like. For example, there can be additional functionality within the cybersecurity infrastructure command validation system 102, the inline agents 104a-n, or the central agent 106. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The infrastructure network 100 and any of the other systems described herein can be implemented in conjunction with any of the hardware components described herein, such as the computing systems described below (e.g., processing units, memory, and the like). In any of the examples herein, the instructions for implementing the cybersecurity infrastructure command validation system 102, the input, output and intermediate data of running the cybersecurity infrastructure command validation system 102 or the validation models therein, and the like can be stored in one or more computer-readable storage media or computer-readable storage devices. The technologies described herein can be generic to the specifics of operating systems or hardware and can be applied in any variety of environments to take advantage of the described features.

Example 3—Cybersecurity Infrastructure Command Validation System Components

Figure 2:
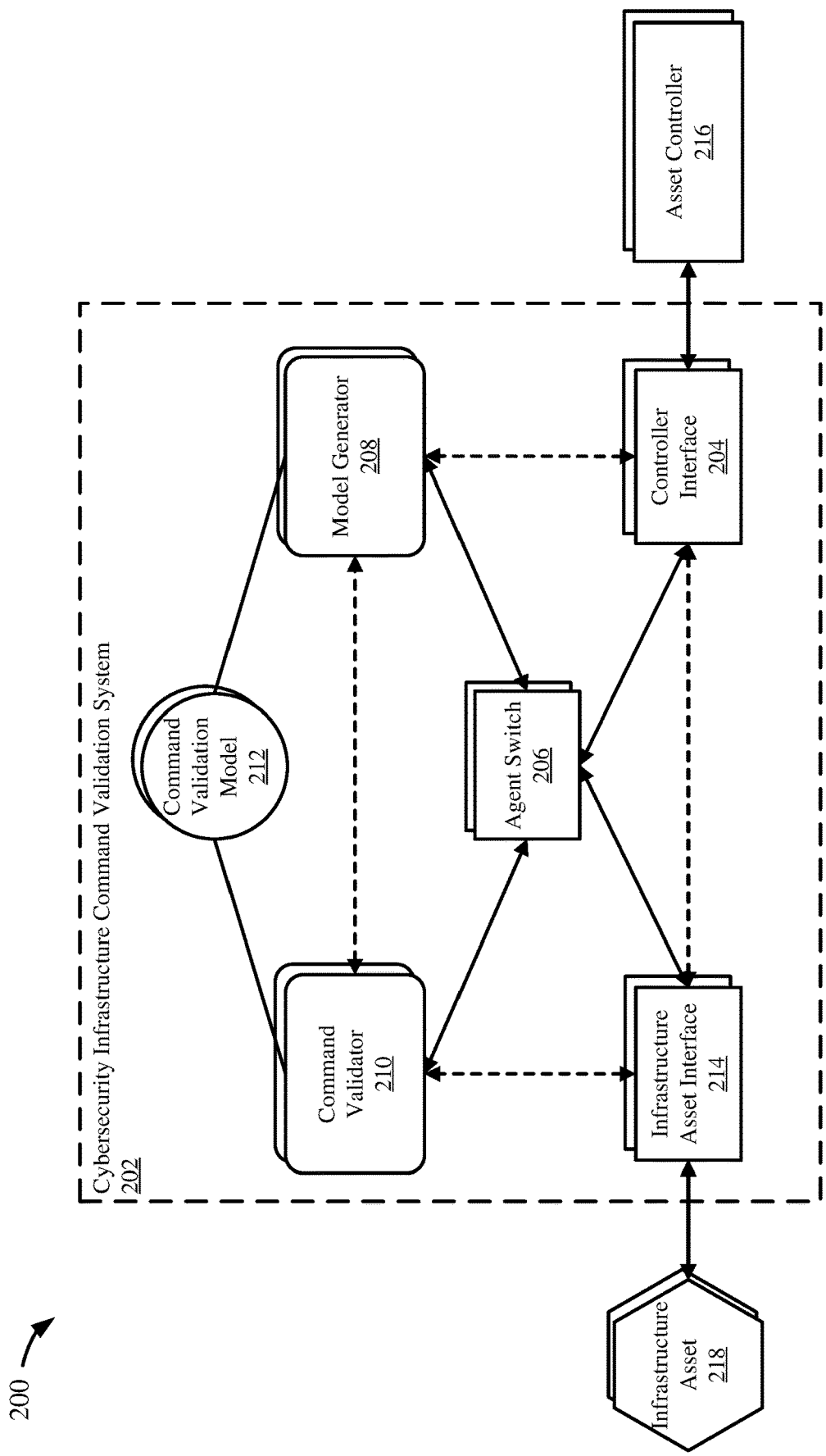
FIG. 2 is an architectural diagram depicting a cybersecurity infrastructure command validation system, as can be included in an infrastructure network.

FIG. 2 is an architectural diagram depicting a cybersecurity infrastructure command validation system 202, as can be included in an infrastructure network 200. The components 204, 206, 208, 210, 212, 214 of the cybersecurity infrastructure command validation system 202 can be implemented in various combinations across inline agents and central agents, as shown in FIG. 1.

The cybersecurity infrastructure command validation system 202 can include one or more agent switches 206. An agent switch 206 can provide communication functionality between the controller interface 204, the model generator 208, the command validator 210, or the infrastructure asset interface 214, or some combination thereof. Additionally or alternatively, the other components 204, 208, 210, 214 can communicate directly between each other, or in combination with the agent switch 206. The agent switch 206 can route a command received at the controller interface 204 for command validation at 210. The agent switch 206 can route the results of command validation received from the command validator 210, which can include providing the validated command to the infrastructure asset interface 214, providing the results to the model generator 208, providing a return message to the controller interface (such as when the command is not validated, or to confirm validation, to the asset controller 216), or to provide other actions for an invalid command (such as logging, messaging, or security protocol actions based on invalid commands). Generally, the agent switch 206 can coordinate activities and responses between the components 204, 208, 210, 214 of the cybersecurity infrastructure command validation system 202.

The cybersecurity infrastructure command validation system 202 can include one or more controller interfaces 204. The controller interface 204 can obtain, intercept, or otherwise receive commands issued by an asset controller 216. Generally, such commands are issued to an infrastructure asset 218. The controller interface 204 can include hardware or software for implementing an API for receiving the controller-issued commands. In some embodiments, the controller interface 204 can be implemented similarly to an interface in an infrastructure asset 218. Additionally or alternatively, the controller interface 204 can appear to be the infrastructure asset 218, such as to an asset controller 216. The controller interface 204 can also be configured to request and receive data from an asset controller 216, such as state or status data for the asset controller.

The cybersecurity infrastructure command validation system 202 can include one or more infrastructure asset interfaces 214. The infrastructure asset interface 214 can send or otherwise provide commands issued by an asset controller 216; generally, such commands provided have been determined to be valid by the cybersecurity infrastructure command validation system 202. The infrastructure asset interface 214 can include hardware or software for implementing an API for communicating with an infrastructure asset 218. In some embodiments, the infrastructure asset interface 214 can be implemented similarly to an interface in an infrastructure asset 218. Additionally or alternatively, the infrastructure asset interface 214 can appear to be the asset controller 216, such as to an infrastructure asset 218. The infrastructure asset interface 214 can also be configured to request and receive data from an infrastructure asset 218, such as state or status data for the infrastructure asset.

The cybersecurity infrastructure command validation system 202 can include a model generator 208. The model generator can generate, refine, update, or otherwise alter or make the command validation model 212. For example, the model generator 208 can be a module or process for training a machine-learning algorithm that performs command validation (e.g. as the command validation model 212). The model generator 208 may receive and use previous command validation results, input commands, state or status data for infrastructure assets, state or status data for asset controllers, training data, or other relevant modeling data, or some combination thereof, for generating the command validation model 212.

The cybersecurity infrastructure command validation system 202 can include a command validation model 212, which can represent valid commands issued by an asset controller 216 to an infrastructure asset 218. The command validation model 212 can include a data model, a mathematical model, an algorithm (e.g. machine-learning algorithm), or other process for analyzing and determining validity of an input infrastructure asset command.

The cybersecurity infrastructure command validation system 202 can include a command validator 210. The command validator 210 can be a module, process, or other engine for validating input infrastructure commands, generally by referencing or executing the command validation model 212. In some embodiments, the command validator 210 can also use infrastructure asset data or asset controller data, in addition to or alternatively to the input command and the command validation model. Such infrastructure asset or asset controller data can include state or status data, across one or more infrastructure assets or asset controllers.

Generally, the model generator 208 generates a command validation model 212 which can be executed by the command validator 210 to determine if an input command is a secure or behaviorally correct command, or if the command appears to be malicious, dangerous, insecure, or otherwise an atypical command based on the infrastructure behavior.

The various components 204, 206, 208, 210, 212, 214 can be installed or implemented across inline agents or central agents, as shown in FIG. 1. In some embodiments, an inline agent can include an asset controller interface 204, an infrastructure asset interface 214, an agent switch 206, a command validator 210, and a command validation model 212, and a central agent can include an asset controller interface 204, a model generator 210, and a command validation model 212, which can be provided to the inline agent.

In alternative or additional embodiments, the inline agent may not have the command validator 210 or the command validation model 212, while the central agent has both and provides command validation functionality to the inline agents.

In alternative or additional embodiments, the model generator may reside in both inline agents, for updating their own respective command validation models 212, and in the central agent, for changes to a base command validation model based on behavioral data across the entire infrastructure, which can be provided to the separate inline agents (which can refine their separate models independently, in some embodiments).

In alternative or additional embodiments, a central agent may not be integrated into the cybersecurity infrastructure command validation system 202, and all components 204, 206, 208, 210, 212, 214 can be integrated into one or more inline agents. In such embodiments, the various inline agents can be configured to communicate between each other, such as for state messaging or command validation model updating.

Thus, the various components 204, 206, 208, 210, 212, 214 can be implemented in any combination thereof across the inline agents and the central agent(s). Further combinations of the components 204, 206, 208, 210, 212, 214 are possible between inline agents and central agents.

Figure 3:
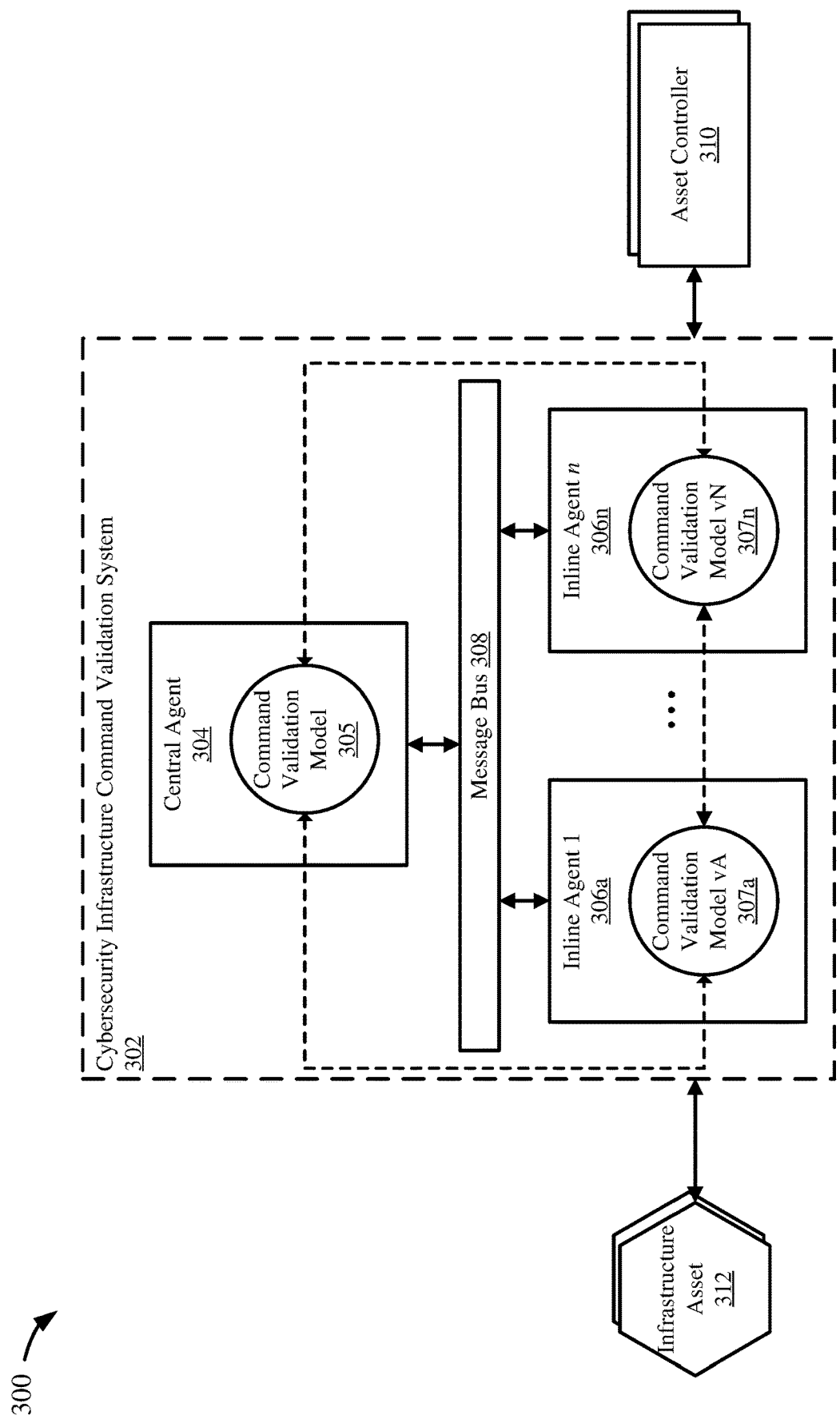
FIG. 3 is an architectural diagram depicting command validation models within a cybersecurity infrastructure command validation system, as can be included in an infrastructure network.

Example 4—Cybersecurity Infrastructure Command Validation System Agents and Models FIG. 3 is an architectural diagram depicting command validation models within a cybersecurity infrastructure command validation system 302, as can be included in an infrastructure network 300. The cybersecurity infrastructure command validation system 302 can communicate with or receive/send commands between asset controllers 310 and infrastructure assets 312, as described herein.

The cybersecurity infrastructure command validation system 302 can include a central agent 304 and one or more inline agents, such as inline agent 1 to inline agent n 306a-n. In some embodiments, the central agent 304 and/or the inline agents 306a-n can communicate via the message bus 308. The message bus 308 generally provides communication functionality between the command validation agents 304, 306a-n, and can include a communication or messaging system, process, microservice, queue, or other communication structure. The message bus 308 can be part of a system platform, such as the VOLTTRON platform as disclosed herein.

In some embodiments, the message bus 308 can include direct communication between agents 304, 306a-n. Alternatively or additionally, the message bus 308 can include a messaging queue, for example, into which an agent can place one or more messages, which can contain command validation data, requests, or responses. Messages on the message bus 308 may be available to any agent 304, 306a-n, or may be identified as being specific to one or more particular agents.

In some embodiments, the message bus 308 can be used to communicate with the infrastructure assets 312 and/or the asset controllers 310, or other components in the infrastructure network 300.

The central agent 304 can include a command validation model 305. The command validation model 305 can be used to validate commands received from the asset controllers 310. For example, an inline agent, such as inline agent 1 306a, can receive a command from an asset controller, and request command validation from the central agent 304. The request may be made via the message bus 308, and can include the received command. The central agent 304 can validate the command via the command validation model 305, and provide the results of the command validation to the inline agent 1 306a via the message bus 308.

The inline agents 306a-n can include respective command validation models, such as command validation model vA through command validation model vN 307a-n. An inline agent 306a-n can validate a command received from an asset controller 310 by executing its command validation model 307a-n against the received command.

In some embodiments, the inline agent command validation models 307a-n can be copies or versions of the central agent command validation model 305. For example, the central agent can generate a new or updated command validation model 305, and then push or otherwise provide copies of the new or updated command validation model to the inline agents 306a-n, which can be stored or accessible to the inline agents as the inline agent command validation models 307a-n.

In alternative or additional embodiments, the inline agent command validation models 307a-n can be refined, customized, or otherwise altered versions of the central agent command validation model 305. For example, the inline agent command validation models 307a-n can be based on the central agent command validation model 305, but specifically customized for the asset controller (e.g. commands) associated with the particular inline agent 306a-n.

In alternative or additional embodiments, the inline agent command validation models 307a-n may be distinct, separate, or unique models specifically generated to validate commands received from the asset controller associated with the specific inline agent 306a-n. For example, such command validation models 307a-n may be generated by their respective inline agents 306a-n.

In alternative or additional embodiments, the inline agent command validation models 307a-n can be related to or based on, at least in part, one or more other inline agent command validation models. For example, updates or changes to one or more inline agent command validation models 307a-n may be shared, passed, or otherwise provided between different inline agents 306a-n.

Example 5—Command Validation Model

Figure 4A:
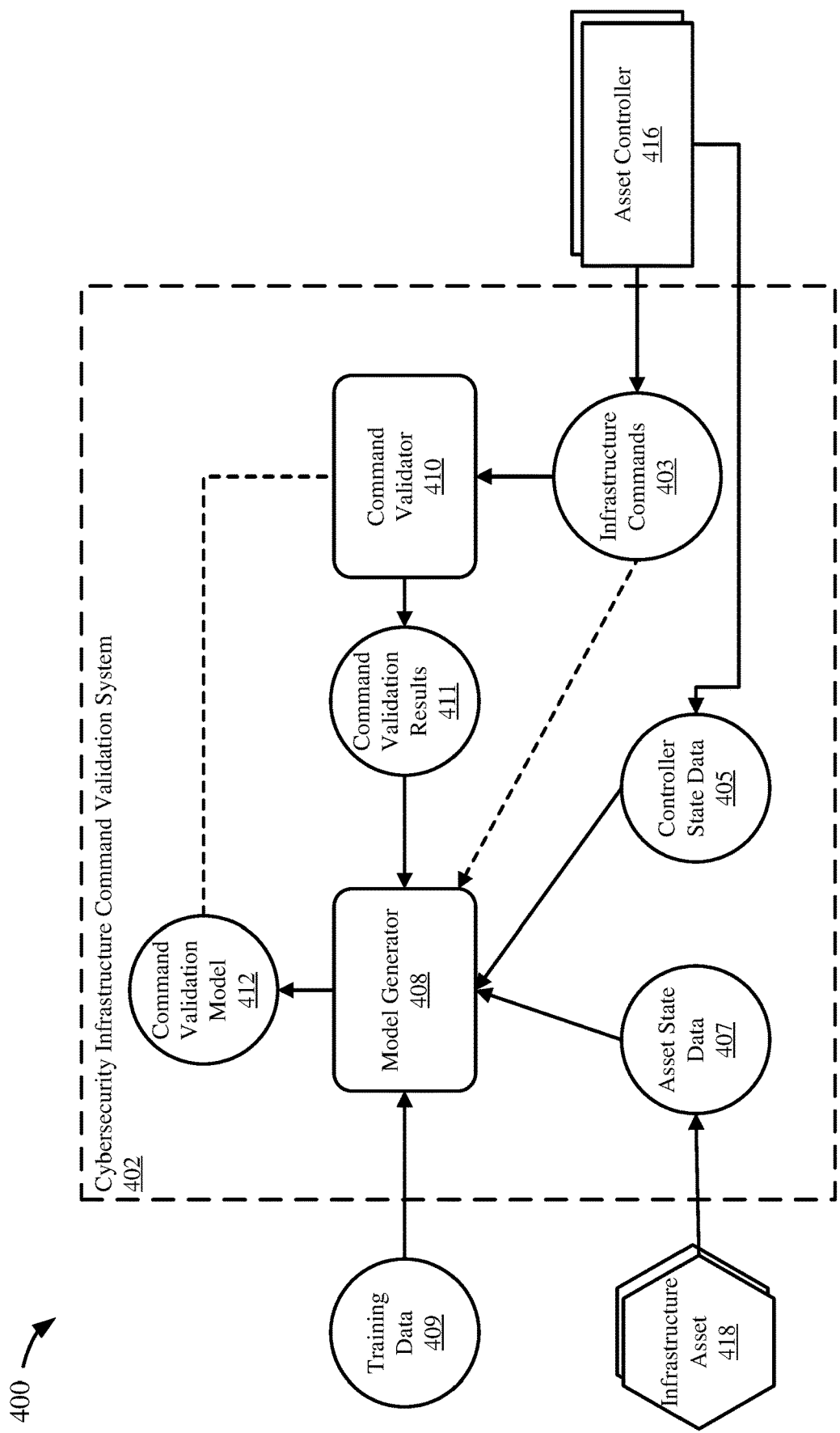
FIG. 4A is a flow diagram depicting data used in generating a command validation model, in an infrastructure network.

FIG. 4A is a flow diagram depicting data used in generating a command validation model, in an infrastructure network 400. A model generator 408 can generator a command validation model 412 based on one or more input data sets 403, 405, 407, 409, 411. In some embodiments, the model generator 408 can additionally or alternatively update, refine, train, modify, or otherwise change the command validation model 412 based on one or more input data sets 403, 405, 407, 409, 411.

The model generator 408 can receive or obtain infrastructure commands 403 for use in generating the command validation model 412. The infrastructure commands 403 can include commands issued by one or more asset controllers 416. Generally, the infrastructure commands 403 can be associated with particular command validation results 411 for the respective commands, and can be provided along with their respectively associated validation results.

The model generator 408 can receive or obtain controller state data 405 for use in generating the command validation model 412. The controller state data 405 can include state or status information about one or more asset controllers 416. For example, the controller state data 405 may include data representing or defining the behavior of the asset controller (e.g. over time).

The model generator 408 can receive or obtain asset state data 407 for use in generating the command validation model 412. The asset state data 407 can include state or status information about one or more infrastructure assets 418. For example, the asset state data 407 may include data representing or defining the behavior of the asset controller (e.g. over time).

The model generator 408 can receive or obtain training data 409 for use in generating the command validation model 412. The training data 409 can include real-world or artificially generated input data for the model generator 408. Generally, the training data 409 can include the other types of input data 403, 405, 407, 411 the model generator 408 can utilize to generate the command validation model 412. The training data 409 can be structured to represent multiple instances of command validation activity which can be used to train a machine-learning algorithm. In some cases, the training data 409 can be log data from previous infrastructure network 400 activity, such as may be generated by the asset controllers 416, the infrastructure assets 418, a command validator 410, or other network components, or some combination thereof.

The model generator 408 can receive or obtain command validation results 411 for use in generating the command validation model 412. The command validation results 411 can include input data and/or output data of the command validator 410. For example, the command validation results 411 can include the infrastructure commands 403 and each command's associated validation result (e.g. pass, fail, warning, high risk, low risk, scaled number or unit, etc.).

The model generator 408 can receive input data 403, 405, 407, 409, 411 (all, one, or some combination thereof) in real-time, at scheduled intervals, or from data storage, such as a database or log file. In this way, the model generator 408 can generate a command validation model 412 which can validate infrastructure commands (e.g. 403) based on the behavior of the infrastructure network 400. Further, the command validation model 412 can be adaptable to account for changes in infrastructure 400 usage over time, or natural drift or variance of infrastructure components (e.g. 416, 418), and thereby providing more robust cybersecurity command validation protection.

Figure 4B:
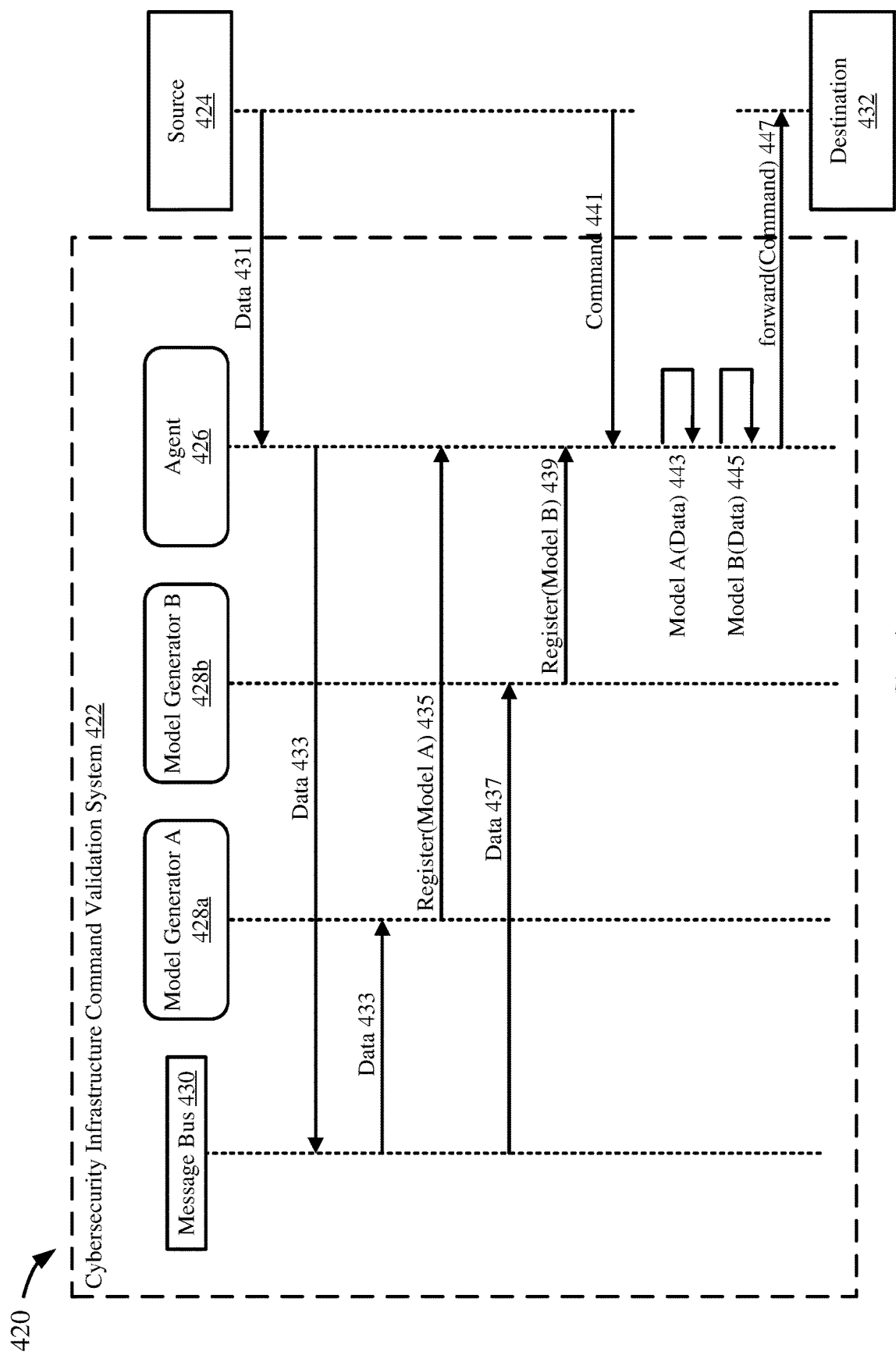
FIG. 4B is a sequence diagram depicting command validation model generation and use from multiple model generators, in an infrastructure network.

FIG. 4B is a sequence diagram depicting command validation model generation and use from multiple model generators, in an infrastructure network 420. A cybersecurity infrastructure command validation system 422 can include an agent 426, a model generator A 428a, a model generator B 428b, and a message bus 430, as described herein.

The agent 426 can include an inline agent and/or a central agent, as described herein. The agent 426 can receive data 431 from a source 424. The source 424 can include a controller and/or an infrastructure asset, or other infrastructure network source, as described herein. The data received at 431 can include the input data 403, 405, 407, 409, 411 to the model generator 408 as shown in FIG. 4A. The agent 426 can pass at 433 the data received to the model generators 428a-b through the message bus 430.

The message bus 430 can provide the data at 433, either by sending or making available for retrieval or some combination thereof, to model generator A 428a. Model generator A 428a can then use the data received to generate or update a command validation model, as described herein. Model generator A 428a can provide and register the model (Model A) at 435 to the agent 426.

Similarly, the message bus 430 can provide the data at 437, either by sending or making available for retrieval or some combination thereof, to model generator B 428b. Model generator B 428b can then use the data received to generator or update a command validation model, as described herein. Model generator B 428b can provide and register the model (Model B) at 439 to the agent 426.

Generally, the models generated by the different model generators 428a-b can be different models for command validation. The steps of sending data at 433 and 437 from the message bus 430 to the model generators 428a-b can be performed in parallel, as can the model generation, and the model registration steps at 435 and 439, as these steps are independent of each other. A similar process can be used with fewer or more model generators. Accordingly, an agent 426 can have multiple models with which to validate infrastructure commands.

Once registered, both models can be used in command validation. For example, a command (e.g. data) can be received at 441 by an agent 426 from a source 424 (e.g. a controller). The agent 426 can execute both Model A at 443 and Model B at 445 to validate the command. The models can be executed 443, 445 in parallel. The results of both of the command validation models can be integrated in determining the validation of the command. For example, the agent 426 may require both models to result in a "pass" or "valid" identification of the command. As an alternative example, the agent 426 can validate a command if any registered model indicates a "pass" or "valid" result. If the command is validated, the command can be forwarded at 447 to the destination 432. Generally, the destination 432 can be an infrastructure asset, as described herein. In this way, the command validation process can be a composite design, built from individual decisions of the registered models.

Example 6—Infrastructure Command Validation Process

Figure 5A:
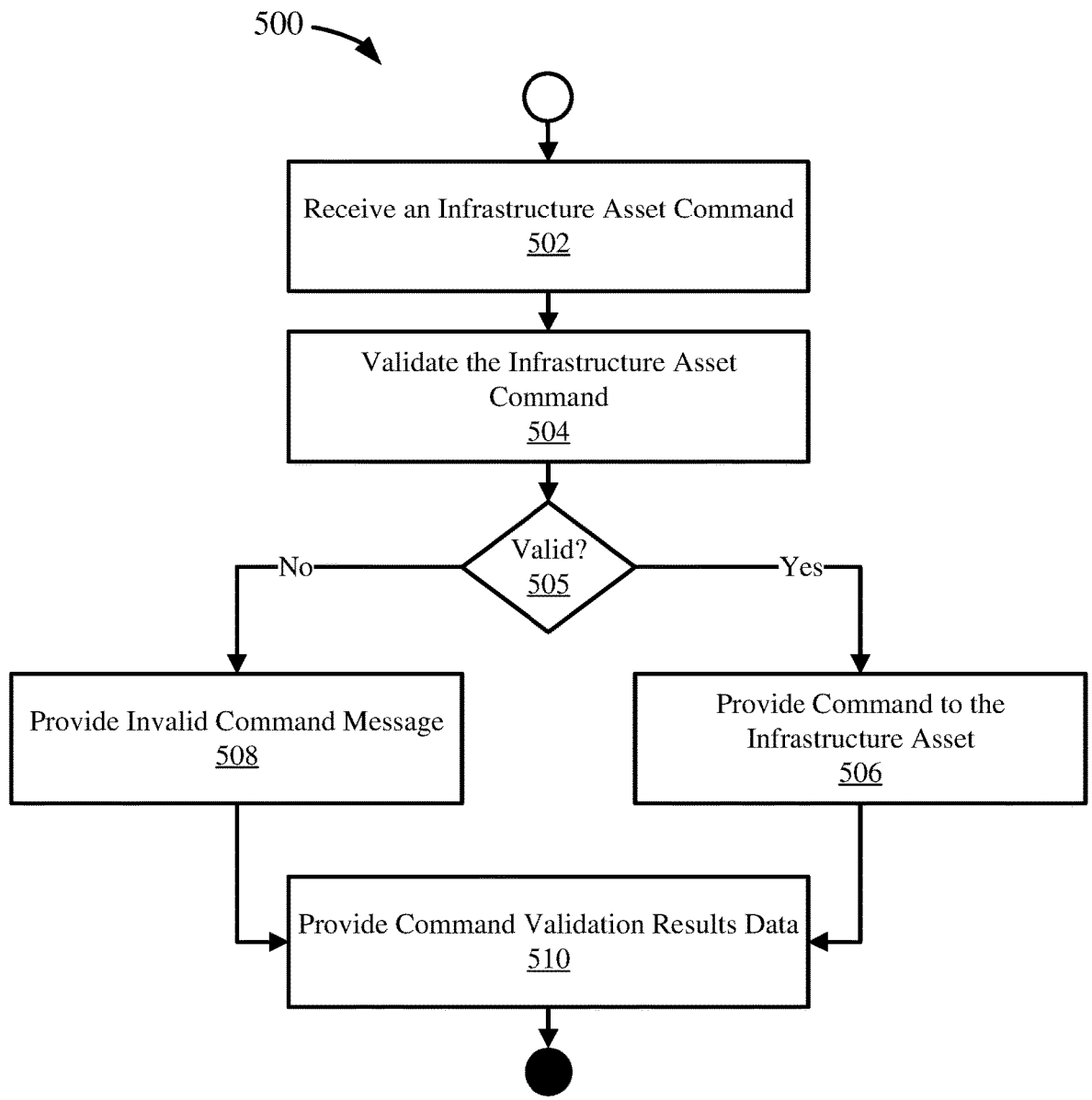
FIG. 5A is a flowchart depicting a process for validating an infrastructure command.

FIG. 5A is a flowchart depicting a process 500 for validating an infrastructure command. Generally, the process 500 can be implemented and/or executed by a cybersecurity infrastructure command validation system as described herein.

An infrastructure asset command can be received at 502. The command can generally be received by an inline agent of a cybersecurity infrastructure command validation system as described herein. The command can include instructions and/or data to elicit a particular action or actions by a target infrastructure asset. For example, the command can be issued by an asset controller for a target or associated infrastructure asset. Receiving the command at 502 can include intercepting the command, such that the command is not received by the intended target infrastructure asset, or is otherwise not executed by the intended target infrastructure asset.

The infrastructure asset command can be validated at 504. Validating the command at 504 can include executing a command validation model against the command received at 502. Validating the command at 504 can include analyzing the received command against the current state of the infrastructure network in which the command was issued, against the current state of the target infrastructure asset of the command, against the current state of the controller which issued the command, or against the set of commands and timing of commands previously issued, or some combination thereof. Executing a command validation model at 504 can include analyzing one or more of these factors, or additional factors. Generally, validating the command at 504 can include determining if the command is likely to result in normal or abnormal behavior of the target infrastructure asset. Validating the command at 504 can include determining if the command meets a threshold for validity or invalidity, or a threshold for likelihood to result in normal or abnormal operation if executed.

Determining validity at 504 can include generating a ranking or a percentage likelihood of validity. For example, a rank of "low," "medium," or "high" can be generated representing likelihood of validity (or invalidity). Alternatively or additionally, a numeric value can be generated, such as on a scale (e.g. from 1 to 10), or a percentage likelihood (e.g. 60% likely valid). Such results can be compared to a threshold to determine validity, either at 504 or at 505. In some embodiments, determining validity at 504 can be a binary condition, such as valid or invalid.

If the command is valid ("yes" at 505), the infrastructure asset command can be provided to the intended target infrastructure asset at 506. Generally, providing a validated command to the target infrastructure asset at 506 includes passing or otherwise sending or issuing the command to the infrastructure asset. In some cases, the command can appear to be from the original command issuer (e.g. the infrastructure asset controller). In this way, the command validation process can be invisible to the infrastructure asset and/or the associated asset controller. In alternative or additional embodiments, providing the command at 506 can include providing an indicator that the command has been validated (e.g. is safe for execution).

If the command is not valid ("no" at 505), the infrastructure asset command is generally not provided to the infrastructure asset, and instead an invalid command message can be generated and provided at 508. The invalid command message can be provided at 508 in a log, or can be sent as a warning to a user terminal. Alternatively or additionally, the invalid command message can be broadcast within the cybersecurity infrastructure command validation system, to notify other agents, for example, of a possible breach (which, in some embodiments, can alter further command validation analysis). The invalid command message can also be broadcast to other devices within the infrastructure network, which can be used to halt, slow, compartmentalize, or otherwise protect the infrastructure network.

Generally, a valid command can be a command deemed to result, when executed, in normal behavior of the infrastructure asset. Generally, an invalid command can be a command deemed to result, when executed, in abnormal, dangerous, suspicious, or otherwise incorrect behavior of the infrastructure asset. In this way, malicious commands, such as can be issued by a compromised asset controller or other infrastructure network component, can be intercepted and detected.

In some embodiments, the command validation results data can be provided at 510. Providing the command validation results data at 510 can include logging the results (which can include the original command received at 502) of the command validation process, such as in a log file or a database. Providing the results at 510 can also include providing the results to a command validation model generator (or otherwise making the results available to a command validation model generator), for generating or updating a command validation model, such as described in FIG. 5B.

The method 500 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 7—Infrastructure Command Validation Model Generation Process

Figure 5B:
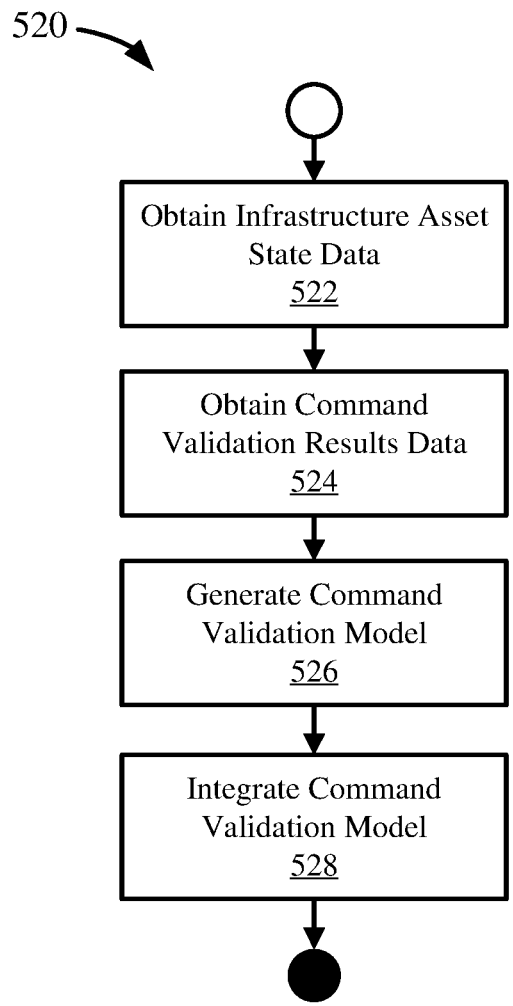
FIG. 5B is a flowchart depicting a process for generating or updating a command validation model.

FIG. 5B is a flowchart depicting a process 520 for generating or updating a command validation model. Generally, the process 520 can be implemented and/or executed by a cybersecurity infrastructure command validation system as described herein.

Infrastructure asset state data can be obtained at 522. Obtaining the asset state data at 522 can include requesting and receiving the state data from the infrastructure asset itself. Alternatively or additionally, obtaining the asset state data at 522 can include accessing and retrieving asset state data from a log file or a database (or other data retention system or internal data structure). In some embodiments, additional state data can be obtained at 522, such as state data for an asset controller associated with the infrastructure asset, or other state data for the infrastructure network in which the infrastructure asset is integrated.

Command validation results data can be obtained at 524. Obtaining validation results data at 524 can include requesting and receiving the results data from a command validator. Alternatively or additionally, obtaining validation results data at 524 can include accessing and retrieving validation results data from a log file or a database (or other data retention system or internal data structure). The command validation results data obtained at 524 can include, in some cases, the issued commands associated with the validation results.

A command validation model can be generated at 526. Generating a command validation model at 526 can include analyzing the data obtained at 522 and at 524 to generate a behavioral model of valid commands and invalid commands. Generally, valid commands are predicted to result in normal operational behavior when executed, while invalid commands are predicted to result in abnormal, dangerous, suspicious, malicious, or other detrimental behavior when executed. Generating the command validation model at 526 can include using the data obtained at 522 and 524 to train a machine-learning algorithm to detect valid and invalid infrastructure commands.

The command validation model can be integrated into to the cybersecurity infrastructure command validation system at 528. Integrating the command validation model at 528 can include making the model available for execution against received infrastructure commands. In some embodiments, integrating the command validation model at 528 can include pushing or sending the command validation model to one or more components within the cybersecurity system, such as to one or more inline agents as described herein. In additional or alternative embodiments, integrating the command validation model at 528 can include copying and storing the command validation model remotely, such as for analysis, testing, or as a back-up.

Example 8—Example Infrastructure Networks, Infrastructure Assets, and Asset Controllers In any of the examples herein, an infrastructure network can include one or more infrastructure assets and one or more asset controllers. An infrastructure network can include additional or further components, as well as the infrastructure assets and asset controllers.

An infrastructure network can include an electrical grid or other power or energy grid. In some cases, an infrastructure network can include a portion or subnetwork of an energy grid. Further, an infrastructure network can include a grid network for a specific area or structure. For example, an infrastructure network can include an energy network within a particular building or complex of buildings. In some cases, an infrastructure network can include an energy network for a particular item, such as an energy or other system for a vehicle (e.g. electric car, airplane, helicopter). An infrastructure network can also include a radiation detection portal, or other sensory network.

An infrastructure asset can be a product, component, part, or other piece of (or be used in conjunction with) an infrastructure network (e.g. energy or electrical grid infrastructure), including software components or hardware components. In some cases, an infrastructure asset can include a combination of components, such as a hardware component with software, or two hardware components acting together to execute a command. In other cases, an infrastructure asset can include a single component, such as software or hardware. Generally, and infrastructure asset can receive commands which direct it to perform one or more actions or functions.

An asset controller can be a component of an infrastructure network which can issue commands or other instructions to one or more infrastructure assets. In some cases, an asset controller can also be an infrastructure asset, which can receive commands from another asset controller.

Example 9—Example Infrastructure Network, Infrastructure Asset, and Asset Controllers In any of the examples herein, a command validation model can include a mathematical model, a programmatic analytical process, a machine-learning algorithm, or other analytical model. For example, a command validation model can be an artificial neural network, trained to identify valid or invalid commands. In some embodiments, the command validation model can function as a connectome-style network (e.g. artificial neural network) where the various separate command validators and their models can communicate input and results data, improving the validation process thereby, such as by accounting for larger network changes, functional drift, or large-scale attacks. Thus, the various inline agents, and in some cases central agents, can share information to increase their respective situational awareness, thereby improving command validation.

Generally, a command validation model can analyze a received command for an infrastructure asset to identify 1) malformed or incorrectly formed commands, and/or 2) commands that will or are likely to result in abnormal or errant behavior of the infrastructure asset if executed. In part, a command validation model can analyze the command against the likely state of the target infrastructure asset if the command were executed. Thus, a command validation model can function as a behavior-based firewall, protecting infrastructure assets against commands that may result in erroneous behavior that can be dangerous or destructive.

Command validation models can be executed at inline agents, central agents, or at both, within the cybersecurity infrastructure command validation system. The command validation models can be updated or refined (e.g. trained if a machine-learning algorithm) at particular intervals (e.g. automatically) or by administrator command (e.g. semi-automatically), based on accumulated infrastructure network data (e.g. validation results data, asset state data, etc.) to improve the command validation results.

Example 10—Cybersecurity Infrastructure Command Validation System Integration

In any of the examples herein, a cybersecurity infrastructure command validation system can be integrated into a new or existing infrastructure network, such as shown in FIG. 1. The components of the cybersecurity infrastructure command validation system, such as the inline agents and central agents, can be integrated as hardware components or software components. For example, the cybersecurity infrastructure command validation system can be implemented on the VOLTTRON platform, in whole or in part.

Because the inline agents and/or central agents are integrated with interfaces for their associated infrastructure assets and asset controllers, the cybersecurity infrastructure command validation system can be transparent to the existing infrastructure network. Further, this allows for the cybersecurity infrastructure command validation system to be integrated into existing or legacy infrastructure networks with no or minimal change to the current infrastructure network.

Generally, inline agents can be integrated close to their associated infrastructure asset, to ensure they receive the command the asset would have received. Central agents can be integrated in a location convenient or conducive to communication between the various inline and central agents, and administrative systems or controls.

Figure 6:
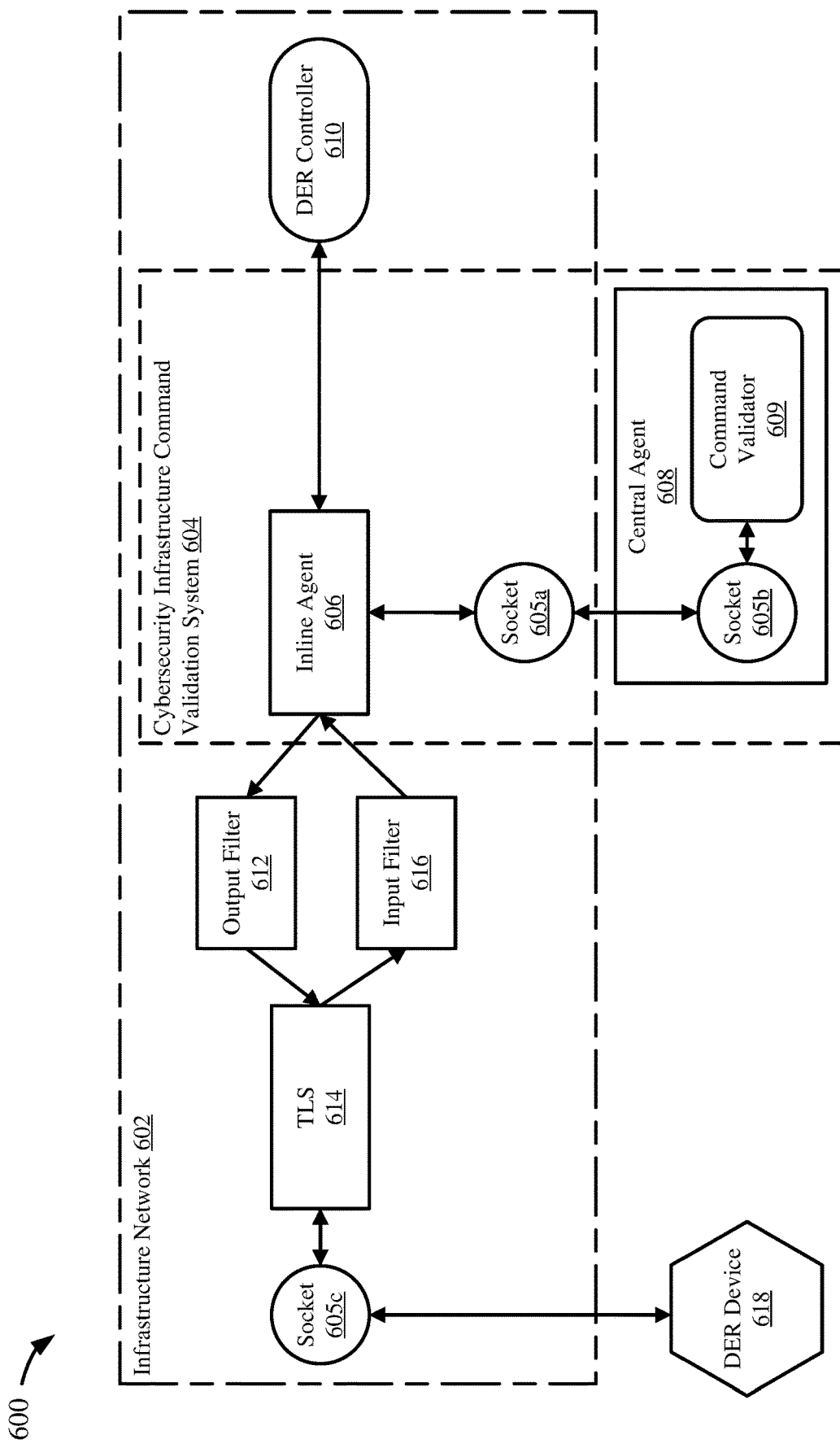
FIG. 6 is a diagram depicting an example implementation of a cybersecurity infrastructure command validation system into an infrastructure network for a DER infrastructure.

Example 11—Example Integration of Cybersecurity Infrastructure Command Validation System into DER Infrastructure FIG. 6 is a diagram depicting an example 600 implementation of a cybersecurity infrastructure command validation system 604 into an infrastructure network 602 for a DER (distributed energy resource) infrastructure.

In example 600, the cybersecurity infrastructure command validation system 604 can be implemented as a framework designed to inspect SEP 2.0 (Smart Energy Profile) requests and block objectionable ones. In this example 600, the cybersecurity infrastructure command validation system 604 can validate SEP 2.0 messages as a part of a SAE J2847 application. The SEP 2.0 application protocol is a representational state transfer (REST) architecture, building upon web services and HTTP. The infrastructure network 602 can include the web services and HTTP REST architecture (e.g. the infrastructure network can utilize HTTPD). SAE J2847 specifies the communication for "grid-optimized energy transfer for plug-in electric vehicles." SAE J2847/3 provides for "reverse power flow" mechanism, in which a plug-in electric vehicle (PEV), e.g. the DER device 618, is a distributed energy resource (DER). Besides charging its batteries, the PEV (e.g. DER device) 618 can provide power to a micro-grid or facility, or act as an element of an application that regulates frequency and voltage to compensate for reactive power.

The cybersecurity infrastructure command validation system 604 can be divided into two components 606, 608. The first component is the inline agent 606, which can be an extension of Apache HTTPD that buffers the SEP 2.0 requests, as they are received from the DER controller 610. The second component is the central agent 608, which can be a VOLTTRON agent that validates the SEP 2.0/J2847 requests, as received from the DER controller 610. The inline agent 606 can forward the SEP 2.0 request to the central agent 608 via the sockets 605*a-b*. The central agent 608 can determine if the request is valid, via the command validator 609, and should be forwarded to the DER device 618. If the central agent 608 approves, the inline agent transmits the request to the DER device 618, via the output filter 612, TLS 614, and socket 605*c*. Otherwise, the inline agent notifies the sender, the DER controller 610, of failure (e.g. an invalid request).

This process can work in reverse, as well, for SEP 2.0 requests coming from the DER device 618 for the DER controller 610, such as via the input filter 616.

The interprocess communication can be based on a UNIX domain socket facility. For example, the sockets 605*a*-*c* can be Unix Domain Sockets (UDS). For example, the central agent 608 can create and listen on socket path/tmp/httpd_inlineagent.sock; the Apache module connects to the socket and sends the request representation. The central agent 608 inspects the representation, via the command validator 609, and responds with one of PERMIT, DENY, or NODECISION. These responses form a ternary logic, where PERMIT maps to true, DENY maps to false, and NODECISION is indeterminate. If true, the inline agent 606 forwards the request to the DER controller 610 or DER device 618, based on the request destination. Otherwise, the DER device 618 or the DER controller 610 is notified of a failure, based on the request source. If the request is forwarded, the central agent 608 is notified of the response.

In some embodiments, the central agent 608 can be integrated into the infrastructure network 602

Example 12—Computing Systems

Figure 7:
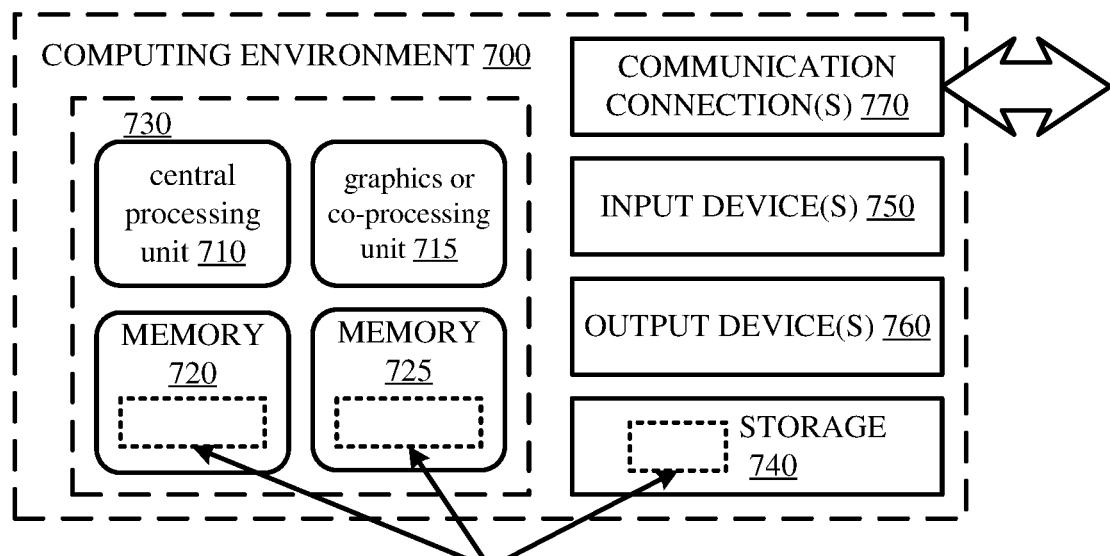
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 5A-B, the systems of FIGS. 1, 2, and 3, or the validation models and examples of FIGS. 4A-B and 6. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store validation models, databases, data sets, examples, or representations shown in FIGS. 4A-B and 6 systems shown in FIGS. 1, 2, and 3, or the steps of the processes shown in FIGS. 5A-B.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 8:
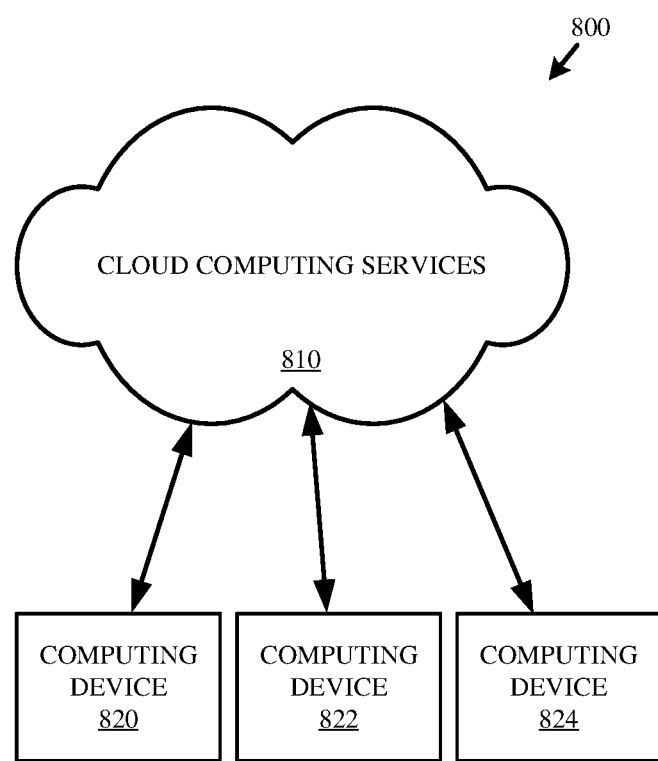
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Example 15—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by one or more computing devices comprising at least one hardware processor and one or more tangible memories coupled to the at least one hardware processor, of protecting a set of controlled infrastructure assets in an infrastructure system, the method comprising:

receiving a first command for one of the set of controlled infrastructure assets;

validating the first command, wherein the first command is validated according to a command validation model, the command validation model having been generated based on data representing at least part of the infrastructure system;

responsive to a successful validation, providing the first command to the one of the set of controlled infrastructure assets;
adapting the command validation model to account for change in usage of the set of controlled infrastructure assets over time and for variance of components of the set of controlled infrastructure assets, including updating the command validation model based on results data of the command validation, the results data including the first command and a validity determination for the first command, wherein the updated command validation model is a process for analyzing and determining validity of one or more subsequent commands for the set of controlled infrastructure assets;
receiving a second command, among the one or more subsequent commands, for another one of the set of controlled infrastructure assets; and
responsive to an unsuccessful validation of the second command, rejecting the second command and preventing the second command from being executed by the other one of the set of controlled infrastructure assets, wherein the second command is malformed or the second command is determined to result in incorrect behavior of the other one of the set of controlled infrastructure assets.

2. The method of claim 1, further comprising:
making available state data of the set of controlled infrastructure assets and/or the results data of the command validation.

3. The method of claim 2, wherein the updating the command validation model is also based on the state data.

4. The method of claim 1, wherein the command validation model implements a machine-learning algorithm.

5. The method of claim 1, wherein the command validation model is a trained neural network.

6. The method of claim 1, wherein the data representing the at least part of the infrastructure system comprises behavioral data for the infrastructure system.

7. The method of claim 1, wherein the data representing the at least part of the infrastructure system comprises results data of previous command validation within the infrastructure system.

8. The method of claim 1, further comprising:
storing the results data of the command validation.

9. One or more non-transitory computer-readable storage media storing computer-executable instructions for causing a computing system, when programmed thereby, to perform operations for infrastructure system protection, the operations comprising:
receiving a first command for a target infrastructure asset of a plurality of infrastructure assets, wherein the plurality of infrastructure assets are integrated into an infrastructure system;
validating the first command, wherein the first command is validated according to a command validation model, the command validation model having been generated based on the plurality of infrastructure assets;
responsive to a successful validation, providing the first command to the target infrastructure asset;
adapting the command validation model to account for change in usage of the plurality of infrastructure assets over time and for variance of components of the plurality of infrastructure assets, including updating the command validation model based on results data of the command validation, the results data including the first command and a validity determination for the first command, wherein the updated command validation model is a process for analyzing and determining validity of one or more subsequent commands for the plurality of infrastructure assets;
receiving a second command, among the one or more subsequent commands, for another infrastructure asset of the plurality of infrastructure assets; and
responsive to an unsuccessful validation of the second command, rejecting the second command and preventing the second command from being executed by the other infrastructure asset, wherein the second command is malformed or the second command is determined to result in incorrect behavior of the other infrastructure asset.

10. The one or more non-transitory computer-readable storage media of claim 9, wherein the command validation model is configured to identify commands resulting in normal asset behavior when executed and/or commands resulting in abnormal asset behavior when executed.

11. The one or more non-transitory computer-readable storage media of claim 9, wherein the operations further comprise:
making available state data of the target infrastructure asset and/or the results data of the command validation.

12. The one or more non-transitory computer-readable storage media of claim 11, wherein the updating the command validation model is also based on the state data.

13. The one or more non-transitory computer-readable storage media of claim 9, wherein the command validation model implements a machine-learning algorithm.

14. The one or more non-transitory computer-readable storage media of claim 9, wherein the command validation model is a trained neural network.

15. The one or more non-transitory computer-readable storage media of claim 9, wherein the command validation model is based on behavioral data for at least one of the plurality of infrastructure assets in the infrastructure system.

16. The one or more non-transitory computer-readable storage media of claim 9, wherein the command validation model is based on results data of previous command validation for at least one of the plurality of infrastructure assets in the infrastructure system.

17. The one or more non-transitory computer-readable storage media of claim 9, wherein the operations further comprise:
storing the results data of the command validation.

18. A system for infrastructure asset security, the system comprising:
one or more memories;
one or more processing units coupled to the one or more memories; and
one or more computer-readable storage media storing instructions that, when loaded into the one or more memories, cause the one or more processing units to perform asset command validation operations comprising:
collecting state data of an infrastructure asset;
collecting validation results data of the infrastructure asset, wherein the validation results data comprises command validation results of one or more previously processed commands for the infrastructure asset;
configuring a command validation model, wherein the command validation model is based, at least in part, on the collected state data and the collected validation results data;
intercepting a first new command for the infrastructure asset, wherein intercepting the first new command prevents or delays the first new command from being received by the infrastructure asset;

analyzing the first new command according to the command validation model, wherein the analyzing comprises determining if the first new command is improperly formed or if the first new command meets a threshold for causing the infrastructure asset to enter a detrimental state when executed by the infrastructure asset;

responsive to the analyzing, providing the first new command to the infrastructure asset or updating a log of the analyzing without providing the first new command to the infrastructure asset;

adapting the command validation model to account for change in usage of the infrastructure asset over time and for variance of components of the infrastructure asset, including updating the command validation model based on new results data from the analyzing the new command according to the command validation model, the new results data including the new command and a validity determination for the new command, wherein the updated command validation model is a process for analyzing and determining validity of one or more subsequent commands for the infrastructure asset;

receiving a second new command, among the one or more subsequent commands, for the infrastructure asset; and responsive to an unsuccessful validation of the second new command, rejecting the second new command and preventing the second new command from being executed by the infrastructure asset, wherein the second new command is malformed or the second new command is determined to result in incorrect behavior of the infrastructure asset.

19. The computer system of claim 18, wherein the command validation model implements a machine-learning algorithm.

20. The computer system of claim 18, wherein the command validation model is a trained neural network.

* * * * *